United States Patent
Nishio et al.

(10) Patent No.: US 9,801,173 B2
(45) Date of Patent: *Oct. 24, 2017

(54) COMMUNICATION APPARATUS AND COMMUNICATION METHOD

(71) Applicant: Sun Patent Trust, New York, NY (US)

(72) Inventors: Akihiko Nishio, Osaka (JP); Hidetoshi Suzuki, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,323

(22) Filed: Dec. 20, 2016

(65) Prior Publication Data

US 2017/0105201 A1    Apr. 13, 2017

Related U.S. Application Data

(63) Continuation of application No. 15/046,332, filed on Feb. 17, 2016, now Pat. No. 9,560,646, which is a (Continued)

(30) Foreign Application Priority Data

Oct. 12, 2010    (JP) .................. 2010-229905

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01)

(58) Field of Classification Search
None
See application file for complete search history.

(56) References Cited

U.S. PATENT DOCUMENTS 7,336,638 B2    2/2008 Cheng et al.
7,376,389 B2    5/2008 Bassiri et al.
(Continued)

FOREIGN PATENT DOCUMENTS

JP    2012-39167 A    2/2012
JP    2012-100232 A    5/2012
(Continued)

OTHER PUBLICATIONS

3GPP TS 36.211 V8.7.0, "3rd Generation Partnership Project; Technical Specification Group Radio Access Network; Evolved Universal Terrestrial Radio Access (E-UTRA); Physical Channels and Modulation (Release 8)," May 2009, 83 pages.
(Continued)

*Primary Examiner* — Bob Phunkulh
(74) *Attorney, Agent, or Firm* — Seed Intellectual Property Law Group LLP

(57) ABSTRACT

A communication apparatus and a communication method capable of suppressing an increase of bits used for a request to send a reference signal and flexibly setting a resource used for sending a reference signal. In a base station, a transmission processing unit transmits, in one of a plurality of formats, control information containing a request to send a sounding reference signal (A-SRS), and a reception processing unit receives the transmitted A-SRS using the resource specified by the format of the transmitted control information. Then, the plurality of formats is associated with each different SRS resource by a setting unit.

10 Claims, 8 Drawing Sheets

|  | DCI fromat 0 | DCI fromat 1A |
|---|---|---|
| FREQUENCY DOMAIN STARTING POSITION | 1 | 1 |
| BANDWIDTH | 48RB | 48RB |
| Cyclic shift | 0 | 6 |
| Comb NUMBER | 0 | 0 |

SRS resource configuration 1    SRS resource configuration 2

Related U.S. Application Data continuation of application No. 14/517,742, filed on Oct. 17, 2014, now Pat. No. 9,301,293, which is a continuation of application No. 13/823,351, filed as application No. PCT/JP2011/004939 on Sep. 2, 2011, now Pat. No. 8,891,452.

(56) References Cited

U.S. PATENT DOCUMENTS

| | | |
|---|---|---|
| 8,014,718 B2 | 9/2011 | Bassiri et al. |
| 8,565,168 B2 | 10/2013 | Papasakellariou et al. |
| 8,948,088 B2 | 2/2015 | Noh et al. |
| 8,953,483 B2 | 2/2015 | Noh et al. |
| 2006/0046642 A1 | 3/2006 | Bassiri et al. |
| 2006/0258383 A1 | 11/2006 | Jiang et al. |
| 2008/0261520 A1 | 10/2008 | Bassiri et al. |
| 2009/0190540 A1 | 7/2009 | Harada et al. |
| 2010/0080187 A1 | 4/2010 | Papasakellariou et al. |
| 2010/0103902 A1 | 4/2010 | Kim et al. |
| 2013/0028134 A1 | 1/2013 | Wang et al. |
| 2013/0163571 A1 | 6/2013 | Ouchi et al. |
| 2013/0182674 A1 | 7/2013 | Lunttila et al. |
| 2013/0208690 A1 | 8/2013 | Nishikawa et al. |

FOREIGN PATENT DOCUMENTS

| | | |
|---|---|---|
| TW | 200531560 A | 9/2005 |
| TW | 200812326 A | 3/2008 |
| TW | I302805 B | 11/2008 |
| TW | 200943775 A | 10/2009 |
| WO | 2009/096730 A1 | 8/2009 |
| WO | 2011-100466 A | 8/2011 |
| WO | 2011/157237 A1 | 12/2011 |

OTHER PUBLICATIONS

3GPP TS 36.212 V8.7.0, "3rd Generation Partnership Project; Technical Specification Group Radio Access Network; Evolved Universal Terrestrial Radio Access (E-UTRA); Multiplexing and channel coding (Release 8)," May 2009, 60 pages.

3GPP TS 36.213 V8.7.0, "3rd Generation Partnership Project; Technical Specification Group Radio Access Network; Evolved Universal Terrestrial Radio Access (E-UTRA); Physical layer procedures (Release 8)," May 2009, 77 pages.

Extended European Search Report, dated Feb. 4, 2014, for corresponding European Patent Application No. 11832250.2-1857 / 2629578, 10 pages.

International Search Report dated Oct. 11, 2011, for corresponding International Application No. PCT/JP2011/004939, 2 pages.

NTT Docomo, "Views on Signaling for Dynamic Aperiodic SRS," R1-105439, 3GPP TSG RAN WG1 Meeting #62bis, Agenda Item: 6.5.2.1, Xian, China, Oct. 11-15, 2010, pp. 1-7.

Qualcomm Incorporated, "Further details on aperiodic dynamic SRS," R1-105582, Agenda Item: 6.5.2.1, 3GPP TSG RAN WG1 #62bis, Xi'an, China, Oct. 11-15, 2010, 4 pages.

Samsung, "SRS Transmission in LTE-A," R1-094576, 3GPP TSG RAN WG1 #59, Agenda Item: 7.4.2, Jeju, Korea, Nov. 9-13, 2009, 3 pages.

Samsung, "Resources for Dynamic SRS Multiplexing," R1-104621, 3GPP TSG RAN WG1 #62, Agenda Item: 6.5.2.1, Madrid, Spain, Aug. 23-28, 2010, 4 pages.

Texas Instruments, "Resource Allocation and Signaling for Aperiodic Sounding," R1-105291, Agenda Item: 6.5.2.1, 3GPP TSG RAN WG1 #62bis, Xian, China, Oct. 11-15, 2010, 4 pages.

English Translation of Taiwanese Search Report dated Sep. 15, 2015, for corresponding TW Application No. 100132999, 1 page.

|  | DCI fromat 0 | DCI fromat 1A |
|---|---|---|
| FREQUENCY DOMAIN STARTING POSITION | 1 | 1 |
| BANDWIDTH | 48RB | 48RB |
| Cyclic shift | 0 | 6 |
| Comb NUMBER | 0 | 0 |

SRS resource configuration 1    SRS resource configuration 2

FIG.5

| | DCI format 0 | | | | DCI format 1A | | | |
|---|---|---|---|---|---|---|---|---|
| | 00 | 01 | 10 | 11 | 00 | 01 | 10 | 11 |
| FREQUENCY DOMAIN STARTING POSITION | NO A-SRS TRANSMISSION | 1 | 4 | 12 | NO A-SRS TRANSMISSION | 1 | 4 | 12 |
| BANDWIDTH | | 48RB | 24RB | 12RB | | 48RB | 24RB | 12RB |
| Cyclic shift | | 0 | 3 | 6 | | 0 | 3 | 9 |
| Comb NUMBER | | 0 | 0 | 0 | | 0 | 0 | 1 |
| SRS resource configuration | | ⇨ 1 | ⇨ 2 | ⇨ 3 | | ⇨ 1 | ⇨ 2 | ⇨ 4 |

RESOURCE CONFIGURATION IS INDIVIDUALLY CONFIGURED ONLY FOR STATE "11"

FIG.8

|  | DCI fromat 0 | DCI fromat 1A | DCI fromat 4 |
|---|---|---|---|
| FREQUENCY DOMAIN STARTING POSITION | 1 | 1 | 1 |
| BANDWIDTH | 48RB | 48RB | 48RB |
| Cyclic shift | 0 | 6 | 0 |
| Comb NUMBER | 0 | 0 | 0 |

⇨ SRS resource configuration 1
1 ANTENNA

⇨ SRS resource configuration 2
4 ANTENNAS (NUMBER OF ANTENNAS CONFIGURED FOR DATA TRANSMISSION)

⇨ SRS resource configuration 3
4 ANTENNAS (NUMBER OF ANTENNAS CONFIGURED FOR DATA TRANSMISSION)

FIG.9

COMMUNICATION APPARATUS AND COMMUNICATION METHOD

BACKGROUND

Technical Field

The claimed invention relates to a communication apparatus and a communication method.

Description of the Related Art

The 3rd Generation Partnership Project Radio Access Network Long Term Evolution (hereinafter, referred to as LTE) (3GPP-LTE) employs orthogonal frequency division multiple access (OFDMA) for the downlink communication scheme and single carrier frequency division multiple access (SC-FDMA) for the uplink communication scheme (see, NPLs 1, 2 and 3, for example). Moreover, periodic sounding reference signals (P-SRS) are used in the uplink of LTE as reference signals for estimating the uplink reception quality.

In order to transmit P-SRS from a terminal to a base station, an SRS transmission subframe which is common to all terminals (hereinafter, referred to as common SRS subframe) is configured. This common SRS subframe is defined by a combination of a predetermined periodicity and a subframe offset on a per-cell basis. In addition, the information on the common SRS subframe is broadcasted to terminals within the cell. For example, when the periodicity is equal to 10 subframes and the offset is 3, the third subframe in a frame (consisting of 10 subframes) is configured as a common SRS subframe. In a common SRS subframe, all the terminals within the cell stop transmission of data signals in the last SC-FDMA symbol of the subframe and use the period as the resources for transmission of reference signals.

Meanwhile, subframes for SRS transmissions are individually configured for terminals by a higher layer (i.e., RRC layer higher than the physical layer) (hereinafter, referred to as individual SRS subframe). Each terminal transmits P-SRS in the configured individual SRS subframe. In addition, parameters for SRS resources (hereinafter, may be referred to as "SRS resource parameters") are configured and reported to each terminal. The parameters for the SRS resources include the bandwidth, bandwidth position (or SRS frequency domain starting position), cyclic shift and comb (corresponding to identification information on the subcarrier group) of the SRS, for example. The terminal transmits SRS using the resources specified by the reported parameters. Additionally, SRS frequency-hopping may be configured.

Meanwhile, the introduction of dynamic aperiodic SRS (hereinafter, referred to as A-SRS) into the uplink of LTE-Advanced, which is an advanced version of LTE (hereinafter, referred to as "LTE-A") has been discussed. The transmission timing of A-SRS is controlled by trigger information (e.g., 1-bit information). This trigger information is transmitted to a terminal from a base station on a physical layer control channel (i.e., PDCCH) (e.g., see NPL 4). To put it more specifically, the terminal transmits A-SRS only upon request for A-SRS transmission made by the trigger information (i.e., A-SRS transmission request). In addition, there has been discussion on defining, as the transmission timing of A-SRS, the first common SRS subframe located after the fourth subframe from the subframe in which the trigger information has been transmitted. As described above, while terminals transmit P-SRS, periodically, terminals are allowed to transmit A-SRS in a concentrated manner within a short period only when uplink data transmissions occur in bursts, for example.

Moreover, LTE-A has control information formats for various types of data assignment reporting. The control information formats in the downlink include: DCI format 1A for allocation of resource blocks consecutive in number (Virtual RBs or Physical RBs); DCI format 1, which allows allocation of RBs not consecutive in number (hereinafter, referred to as "non-contiguous bandwidth allocation"); DCI formats 2 and 2A for assigning a spatial-multiplexing MIMO transmission; a downlink assignment control information format for assigning a beam-forming transmission ("beam-forming assignment downlink format": DCI format 1B); and a downlink assignment control information format for assigning a multi-user MIMO transmission ("multi-user MIMO assignment downlink format": DCI format 1D). Meanwhile, the uplink assignment formats include DCI format 0 for assigning a single antenna port transmission and DCI format 4 for assigning an uplink spatial-multiplexing MIMO transmission. DCI format 4 is used for only terminals in which uplink spatial-multiplexing MIMO transmission is configured.

In addition, DCI format 0 and DCI format 1A are adjusted in size by padding so that each format consists of the same number of bits. DCI format 0 and DCI format 1A are also called DCI format 0/1A in some cases. DCI formats 1, 2, 2A, 1B and 1D are used in accordance with downlink transmission modes configured in each terminal (i.e., non-contiguous bandwidth allocation, spatial-multiplexing MIMO transmission, beam-forming transmission and multi-user MIMO transmission) and are formats to be configured in each terminal. Meanwhile, DCI format 0/1A can be used independently of the transmission modes and thus can be used for terminals in any transmission mode, i.e., DCI format 0/1A is a format commonly usable in all terminals. In addition, when DCI format 0/1A is used, single-antenna transmission or transmit diversity is used as the default transmission mode.

Terminals receive DCI format 0/1A and the DCI formats that are dependent on the downlink transmission modes. In addition, terminals in which uplink spatial-multiplexing MIMO transmission is configured receive DCI format 4 in addition to the DCI formats mentioned above.

In this respect, using DCI format 0 for reporting the trigger information for A-SRS has been discussed. DCI format 0 is a control information format used in reporting uplink data (PUSCH) assignment. The field for reporting the trigger for A-SRS is added to DCI format 0 in addition to RB reporting field, MCS reporting field, HARQ information reporting field, transmission power control command reporting field and terminal ID field. It should be noted that, A-SRS and P-SRS can be used together or singly. In addition, parameters for SRS resources (e.g., transmission bandwidth, cyclic shift and/or the like) are configured independently for A-SRS and P-SRS.

CITATION LIST

Non-Patent Literature

NPL 1 3GPP TS 36.211 V8.7.0, "Physical Channels and Modulation (Release 8)," September 2008

NPL 2 3GPP TS 36.212 V8.7.0, "Multiplexing and channel coding (Release 8)," September 2008

NPL 3 3GPP TS 36.213 V8.7.0, "Physical layer procedures (Release 8)," September 2008

NPL 4 3GPP TSG RAN WG1 meeting, R1-105439, "Views on Signaling for Dynamic Aperiodic SRS," October 2010

BRIEF SUMMARY

Technical Problem

When the above mentioned trigger information for A-SRS is represented by a single bit, the trigger information can be used to report two states indicating a request for A-SRS transmission and no A-SRS transmission. In this case, all the SRS resource parameters (e.g., bandwidth, cyclic shift and/or the like) are reported semi-statically using higher layer control information (i.e., RRC signaling). Frequent reporting using RRC signaling is not preferable in terms of the overhead for the control information as well as the processing load on base stations and terminals. Accordingly, each terminal uses the configured SRS resource parameters for a long period of time.

In this case, an assumption is made that each terminal uses the SRS resources previously configured by RRC signaling for a long period of time when the trigger information for A-SRS is represented by a single bit. Accordingly, when the trigger information is transmitted to a plurality of terminals, there is a possibility of collision between SRSs transmitted from a plurality of terminals in the same SRS transmission subframe. This possibility increases as the number of terminals increases. To avoid this collision, the SRS transmission timings of the plurality of terminals need to be varied. To put it more specifically, it is necessary to delay the A-SRS transmission timing of any of the terminals. For this reason, when the trigger information for A-SRS is represented by a single bit, the delay of A-SRS causes a reduction in the accuracy of frequency scheduling in base stations, leading to a reduction in the system throughput due to degraded accuracy in MCS selection.

Meanwhile, it is possible to configure the SRS resources in the units of subframes by increasing the number of bits representing the trigger information for A-SRS. For example, four states can be reported when two bits are used to represent the trigger information. The four states herein include no A-SRS transmission, and requests for A-SRS transmission with cyclic shift 1 (i.e., transmission using SRS resource 1), A-SRS transmission with cyclic shift 2 (i.e., transmission using SRS resource 2), and A-SRS transmission with cyclic shift 3 (i.e., transmission using SRS resource 3). In this configuration, since the flexibility in configuring the SRS resources is increased to some extent, the probability of SRS resources being identical between terminals is reduced. Thus, the probability of collision between the transmitted SRSs can be reduced. However, since the number of bits used to represent the trigger information for A-SRS is increased, there arises a problem that the overhead for the control information increases.

An object of the claimed invention is to provide a communication apparatus and a communication method that allow flexibly configuring resources used for transmission of reference signals while limiting an increase in the number of bits used to request the transmission of reference signals.

Solution to Problem

A communication apparatus according to an aspect of the claimed invention includes: a receiving section that receives control information in one of a plurality of formats, the control information including a transmission request for sounding reference signals (SRS); and a transmitting section that transmits the SRS, using a resource identified by the format of the received control information, in which the plurality of formats are respectively associated with different resource configuration numbers identifying the resources.

A communication apparatus according to an aspect of the claimed invention includes: a transmitting section that transmits control information in one of a plurality of formats, the control information including a transmission request for sounding reference signals (SRS); and a receiving section that receives the SRS transmitted using a resource identified by the format of the control information, in which the plurality of formats are respectively associated with different resource configuration numbers identifying the resources.

A communication method according to an aspect of the claimed invention includes: identifying a resource from a format of control information including a transmission request for sounding reference signals (SRS) received in one of a plurality of formats; transmitting the SRS using the identified resource, in which the plurality of formats are respectively associated with different resource configuration numbers identifying the resources.

A communication method according to an aspect of the claimed invention includes: transmitting control information in one of a plurality of formats, the control information including a transmission request for sounding reference signals (SRS); and receiving the SRS transmitted using a resource identified by the format of the control information, in which the plurality of formats are respectively associated with different resource configuration numbers identifying the resources.

Advantageous Effects of Invention

The claimed invention can provide a communication apparatus and a communication method that allow flexibly configuring resources used for transmission of reference signals while limiting an increase in the number of bits used in a request for the transmission of reference signals.

BRIEF DESCRIPTION OF THE SEVERAL VIEWS OF THE DRAWINGS

FIG. 5 is a diagram provided for describing rules for A-SRS transmission;

FIG. 8 is a diagram provided for describing a variation of the rules for A-SRS transmission; and FIG. 9 is a diagram provided for describing rules for A-SRS transmission according to Embodiment 3.

DETAILED DESCRIPTION

Figure 1:
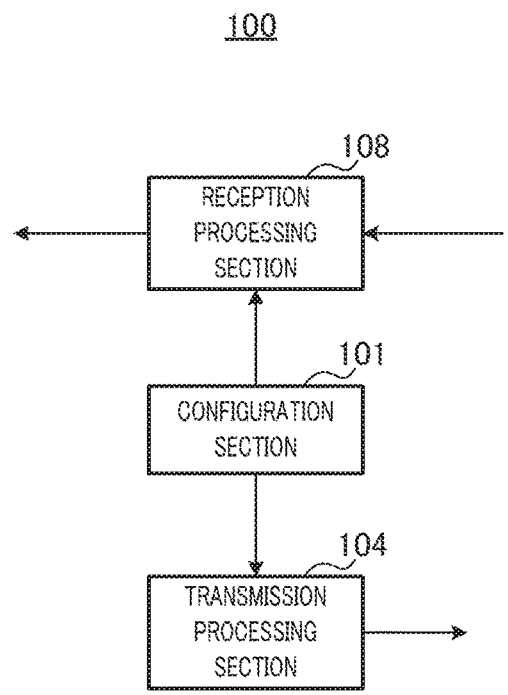
FIG. 1 is a main configuration diagram of a base station according to Embodiment 1 of the claimed invention.

Hereinafter, embodiments of the claimed invention will be described in detail with reference to the drawings.

Throughout the embodiments, the same elements are assigned the same reference numerals and any duplicate description of the elements is omitted.

Embodiment 1

(Overview of Communication System)

A communication system according to Embodiment 1 of the claimed invention includes base station 100 and terminals 200.

Base station 100 is an LTE-A compliant base station and terminals 200 are LTE-A compliant terminals.

FIG. 1 is a main configuration diagram of base station 100 according to Embodiment 1 of the claimed invention. In base station 100, transmission processing section 104 transmits control information including a request for transmission of sounding reference signals (hereinafter, "A-SRS"), using one of a plurality of formats, and reception processing section 108 receives A-SRS transmitted using the resources identified by the format of the transmitted control information. Configuration section 101 associates the plurality of formats with different SRS resource configuration numbers, respectively.

Figure 2:
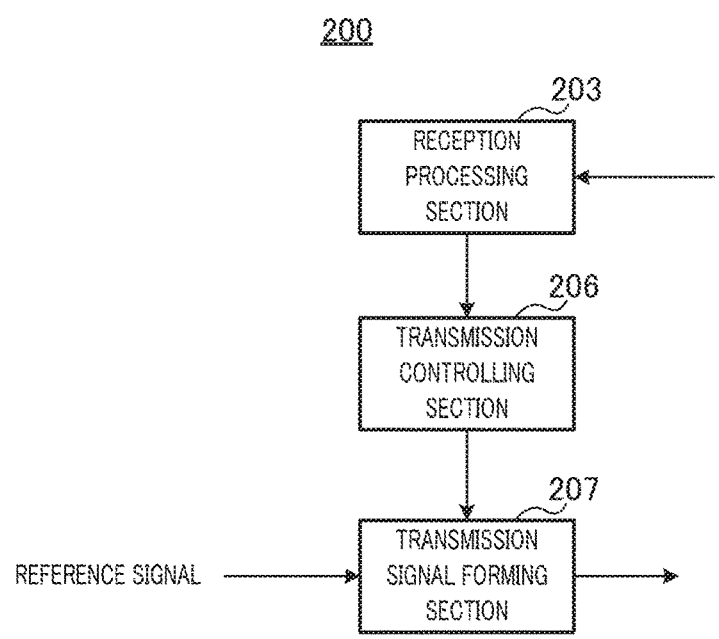
FIG. 2 is a main configuration diagram of a terminal according to Embodiment 1 of the claimed invention.

FIG. 2 is a main configuration diagram of terminal 200 according to Embodiment 1 of the claimed invention. In terminal 200, reception processing section 203 receives control information including a request for transmission of sounding reference signals (hereinafter, "A-SRS"), using one of the plurality of formats, and transmission signal forming section 207 transmits A-SRS using the resources identified by the format of the received control information. Transmission controlling section 206 associates the plurality of formats with different SRS resource configuration numbers, respectively.

Hereinafter, a description will be provided with an assumption that an FDD system, which separates the uplink and downlink into two frequency bands, is employed.

(Configuration of Base Station 100)

Figure 3:
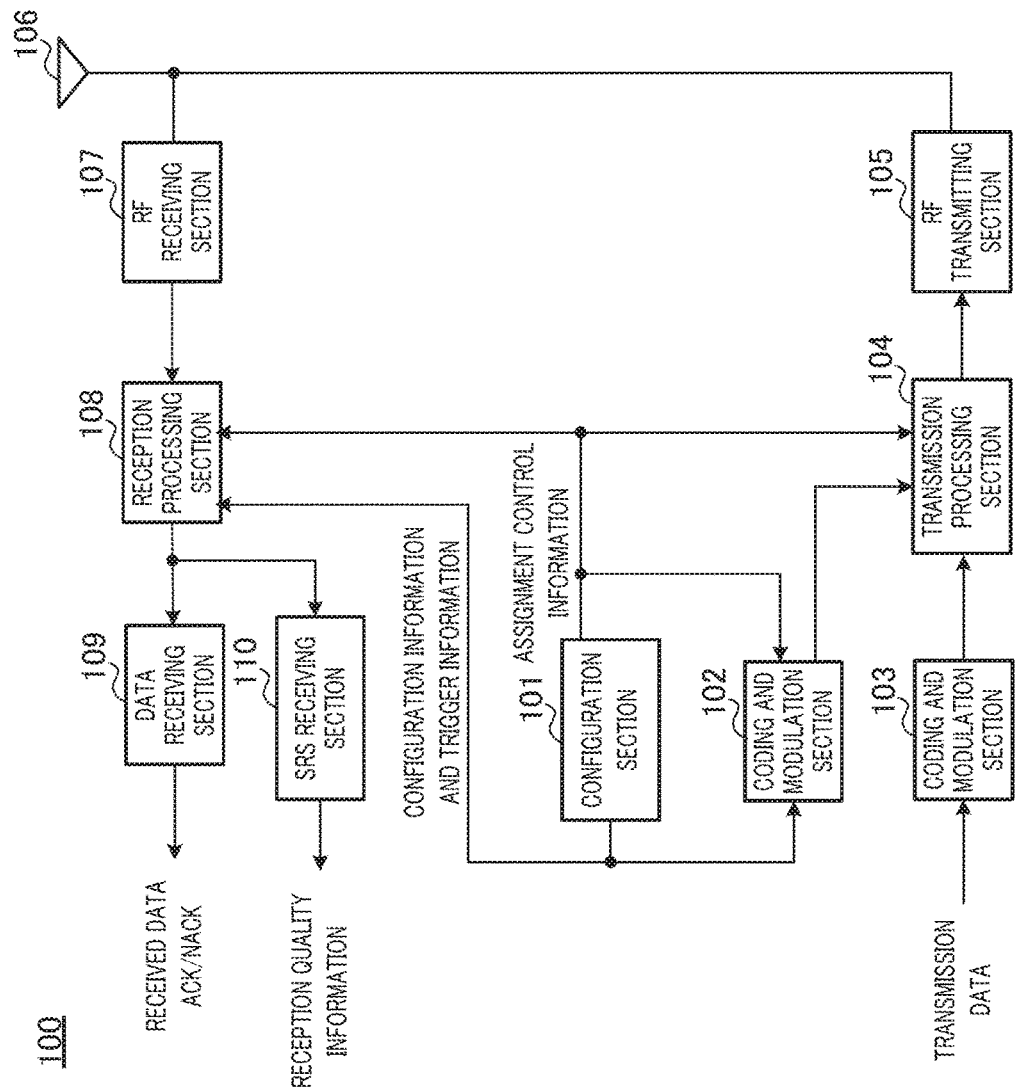
FIG. 3 is a block diagram illustrating a configuration of the base station according to Embodiment 1 of the claimed invention.

FIG. 3 is a block diagram illustrating a configuration of base station 100 according to Embodiment 1 of the claimed invention. In FIG. 3, base station 100 includes configuration section 101, coding and modulation sections 102 and 103, transmission processing section 104, RF (Radio Frequency) transmitting section 105, antenna 106, RF (Radio Frequency) receiving section 107, reception processing section 108, data receiving section 109 and SRS receiving section 110.

Configuration section 101 generates "A-SRS transmission rule configuration information" for configuring a correspondence between a control information format (e.g., DCI format) used for transmitting a request for A-SRS to configuration target terminal 200, and resources used for the transmission of A-SRS from configuration target terminal 200 (hereinafter, A-SRS resource).

The A-SRS transmission rule setting information includes identification information on a plurality of control information formats (i.e., DCI formats) and information about A-SRS resources corresponding to the identification information on each of the control information formats. These A-SRS resources are resources to which terminal 200 maps A-SRS as described above.

The information about A-SRS resources includes parameters such as a frequency bandwidth (or the initial RB position of SRS bandwidth), bandwidth (or the number of RBs), cyclic shift, transmission comb, the number of antennas, the number of transmissions, frequency hopping and component carrier. To put it more specifically, based on the A-SRS transmission rule configuration information, combinations each include the identification information on one of the plurality of control information formats (i.e., DCI formats) and the parameters corresponding to the identification information on the control information formats are configured for configuration target terminal 200.

In addition, configuration section 101 generates uplink assignment control information or downlink assignment control information including trigger information instructing instruction target terminal 200 to transmit A-SRS (hereinafter, simply referred to as "trigger information").

As described above, the A-SRS transmission rule configuration information generated by configuration section 101 is transmitted to configuration target terminal 200 after the A-SRS transmission rule configuration information undergoes transmission processing performed by coding and modulation section 102, transmission processing section 104 and RF transmitting section 105, as the control information of the RRC layer. In addition, the control information including the trigger information for A-SRS transmission is transmitted to configuration target terminal 200 after the control information undergoes transmission processing performed by coding and modulation section 102, transmission processing section 104 and RF transmitting section 105, as the control information of the layers 1 and 2. The trigger information is represented by a single bit. When the bit is 0, this means that the trigger information indicates the instruction to transmit A-SRS. When the bit is 1, this means that the trigger information indicates no A-SRS transmission.

Configuration section 101 generates assignment control information including resource (i.e., RB) assignment information and MCS information for one or a plurality of transport blocks (TB), as control information including the trigger information.

The assignment control information includes assignment control information on uplink resources for assigning uplink data (e.g., physical uplink shared channel (PUSCH)) and downlink resources for assigning downlink data (e.g., physical downlink shared channel (PDSCH)). The assignment control information for assigning uplink data include DCI formats 0 and 4 and examples of assignment control information for assigning downlink data include DCI formats 1A, 1, 1B, 1D, 2 and 2A.

Configuration 101 transmits the A-SRS transmission rule configuration information to configuration target terminal 200 via coding and modulation section 102 and also outputs the A-SRS transmission rule configuration information to reception processing section 108. In addition, configuration section 101 transmits the assignment control information including the trigger information to configuration target terminal 200 via coding and modulation section 102 and also outputs the assignment control information to transmission processing section 104. Moreover, configuration section 101 outputs information indicating the format (i.e., DCI format) of the assignment control information including the trigger information.

Base station 100 reports the configuration information to terminal 200 as higher layer information (i.e., using RRC signaling). Meanwhile, base station 100 reports the assignment control information and the trigger information to terminal 200, using physical downlink control channel (PDCCH). To put it more specifically, while the reporting intervals of the configuration information are relatively long (i.e., the configuration information is reported between relatively long intervals), the reporting intervals of the assignment control information and the trigger information are relatively short (i.e., the assignment control information and the trigger information are reported between relatively short intervals).

Coding and modulation section 102 encodes and modulates the configuration information, trigger information and assignment control information received from configuration section 101 and outputs the obtained modulation signals to transmission processing section 104.

Coding and modulation section 103 encodes and modulates data signals to be received and outputs the obtained modulation signals to transmission processing section 104.

Transmission processing section 104 forms transmission signals by mapping the modulation signals to be received from coding and modulation sections 102 and 103 to the resources indicated by the downlink resource assignment information received from configuration section 101. In a case where the transmission signals are OFDM signals, OFDM signals are formed by mapping the modulation signals to the resources indicated by the downlink resource assignment information to be received from configuration section 101, transforming the mapped signals into a time waveform by inverse fast Fourier transform (IFFT) and adding cyclic prefix (CP) to the resultant signals.

RF transmitting section 105 performs radio transmission processing (e.g., up-conversion, digital to analog (D/A) conversion and/or the like) on the transmission signals received from transmission processing section 104 and transmits the resultant signals via antenna 106.

RF receiving section 107 performs radio reception processing (e.g., down-conversion, analog to digital (A/D) conversion and/or the like) on the radio signals received via antenna 106 and outputs the obtained received signals to reception processing section 108.

Reception processing section 108 identifies the resources to which the uplink data signals and ACK/NACK information are mapped, on the basis of the uplink resource assignment information received from configuration section 101 and extracts a signal component mapped to the identified resources from the received signals.

In addition, reception processing section 108 identifies the resources to which A-SRS is mapped, on the basis of transmission rule configuration information, the trigger information and the DCI format information received from configuration section 101, and extracts a signal component mapped to the identified resources from the received signals. The DCI format information herein is the one used for the instruction to transmit A-SRS. To put it more specifically, reception processing section 108 receives A-SRS on the identified resources described above in the first common SRS subframe located at or after the fourth subframe from the subframe in which the trigger information is transmitted.

In a case where the received signals are spatially multiplexed signals (i.e., multi-codeword (CW) transmission), reception processing section 108 demultiplexes the signals for each CW. In addition, in a case where the received signals are OFDM signals, reception processing section 108 performs an inverse discrete Fourier transform (IDFT) on the extracted signal component to transform the OFDM signals into time-domain signals.

The uplink data signals and ACK/NACK information extracted by reception processing section 108 as described above are outputted to data receiving section 109 while A-SRS signals are outputted to SRS receiving section 110.

Data receiving section 109 decodes the signals received from reception processing section 108. The uplink data and ACK/NACK information are thus obtained.

SRS receiving section 110 measures reception quality of each frequency resource on the basis of A-SRS signals received from reception processing section 108 and outputs the reception quality information. When a plurality of A-SRS signals to be transmitted from different terminals 200 are code-multiplexed using orthogonal sequences and/or the like, SRS receiving section 110 also demultiplexes the code-multiplexed plurality of A-SRS signals.

(Configuration of Terminal 200)

Figure 4:
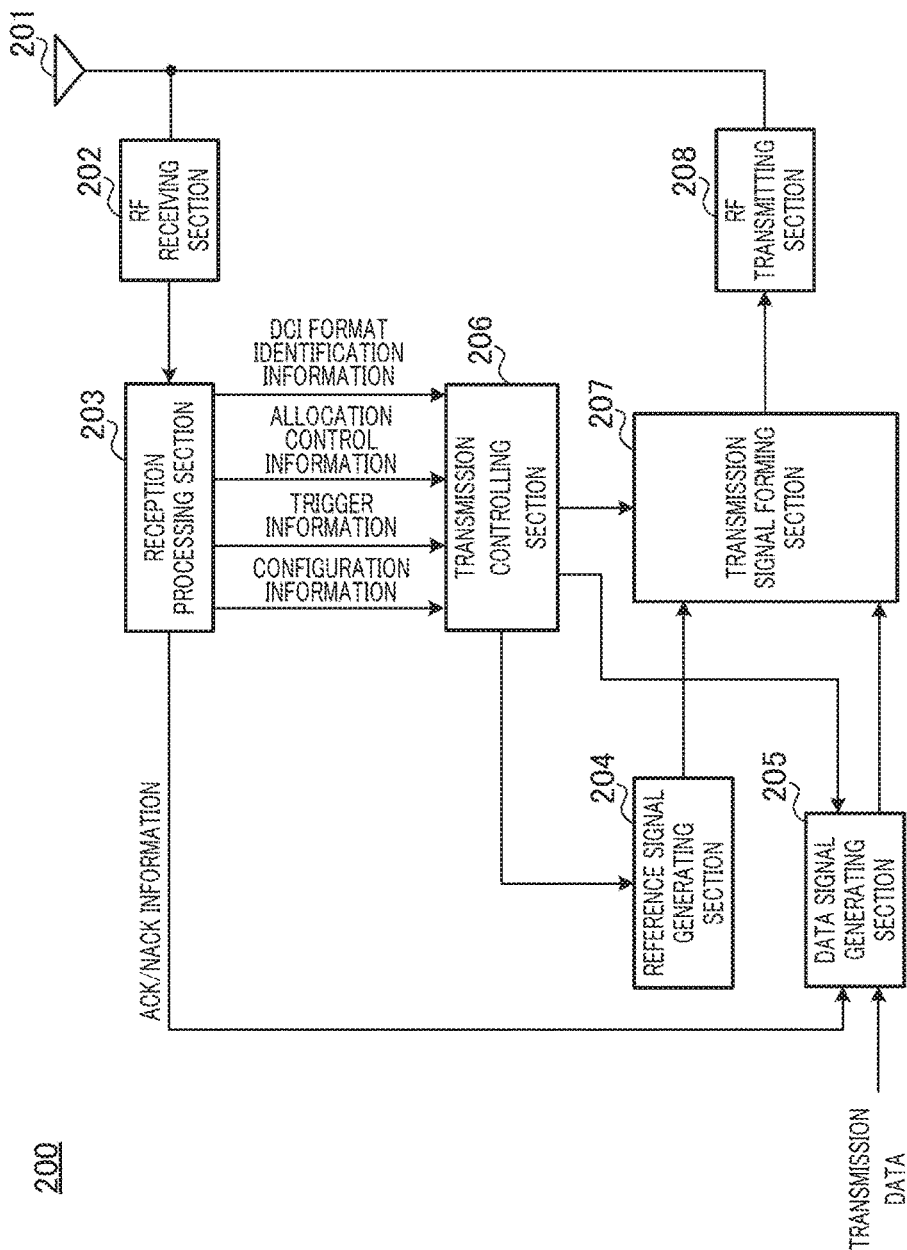
FIG. 4 is a block diagram illustrating a configuration of the terminal according to Embodiment 1 of the claimed invention.

FIG. 4 is a block diagram illustrating the configuration of terminal 200 according to Embodiment 1 of the claimed invention. Terminal 200 herein is an LTE-A compliant terminal.

In FIG. 4, terminal 200 includes antenna 201, RF receiving section 202, a reception processing section 203, reference signal generating section 204, data signal generating section 205, transmission controlling section 206, transmission signal forming section 207 and RF transmitting section 208.

RF receiving section 202 performs radio reception processing (e.g., down-conversion, analog to digital (A/D) conversion and/or the like) on the radio signals received via antenna 201 and outputs the obtained received signals to reception processing section 203.

Reception processing section 203 extracts the configuration information, assignment control information, trigger information and data signals included in the reception signals.

Reception processing section 203 outputs the configuration information, assignment control information and trigger information to transmission controlling section 206.

In addition, reception processing section 203 outputs the format identification information on the DCI from which the trigger information has been extracted to transmission controlling section 206. Moreover, reception processing section 203 performs error detection processing on the extracted data signals and outputs ACK/NACK information in accordance with the result of error detection to data signal generating section 205.

Upon receipt of an instruction to generate reference signals from transmission controlling section 206, reference signal generating section 204 generates and output reference signals to transmission signal forming section 207.

Data signal generating section 205 receives the ACK/NACK information and transmission data and generates data signals by encoding and modulating the ACK/NACK information and transmission data on the basis of MCS information received from transmission controlling section 206.

For non-MIMO transmission, data signals are generated using a single codeword (CW) while data signals are generated using two codewords for MIMO transmission. It should be noted that, data signal generating section 205 also performs CP removal processing and FFT processing when the received signals are OFDM signals.

Transmission controlling section 206 configures the resources to which terminal 200 maps A-SRS signals. To put it more specifically, transmission controlling section 206 identifies the resources on the basis of the configuration information (i.e., A-SRS transmission rule configuration information) and the format identification information on the DCI from which the trigger information has been extracted. The configuration information and the format identification information on the DCI are received from reception processing section 203. Incidentally, how the SRS mapping resources are identified will be described in detail, hereinafter.

Transmission controlling section 206 configures the first common SRS subframe located after the fourth subframe from the subframe in which the trigger information is transmitted, as the transmission subframe for A-SRS. Upon receipt of the trigger information, transmission controlling section 206 outputs an instruction to generate reference signals to reference signal generating section 204 and also outputs the information about the identified SRS resources described above to transmission signal forming section 207.

Transmission controlling section 206 identifies "data mapping resources" to which data signals are mapped, on the basis of the assignment control information to be received from reception processing section 203. Transmission controlling section 206 outputs information about the data mapping resources (hereinafter, may be referred to as "data mapping resource information") to transmission signal forming section 207 and also outputs MCS information included in the assignment control information to data signal generating section 205.

Transmission signal forming section 207 maps the A-SRS signals received from reference signal generating section 204 to the SRS mapping resources. In addition, transmission signal forming section 207 maps the data signals received from data signal generating section 205 to the data mapping resources indicated by the data mapping resource information. Transmission signals are generated in the manner described above. It should be noted that, for Non-MIMO transmission, single codeword data signals are assigned to a single layer while two codeword data signals are assigned to a plurality of layers for MIMO transmissions. Meanwhile, when the transmission signals are OFDM signals, transmission signal forming section 207 performs a discrete Fourier transform (DFT) on the data signals and maps the resultant data signals to the data mapping resources. Furthermore, CP is added to the transmission signals thus formed.

RF transmitting section 208 performs radio transmission processing (e.g., up-conversion, digital to analog (D/A) conversion and/or the like) and thereafter transmits the processed signals via antenna 201.

(Operations of Base Station 100 and Terminal 200)

A description will be provided regarding operations of base station 100 and terminal 200 respectively including the abovementioned configurations. The description will be provided herein regarding a case where base station 100 uses DCI format 0 as the format of uplink resource assignment control information and also uses DCI format 1A as the format of downlink resource assignment control information.

In base station 100, configuration section 101 configures A-SRS transmission rule configuration information for configuration target terminal 200. In the A-SRS transmission rule configuration information, pieces of identification information on the plurality of control information formats (i.e., DCI formats) are associated with resource configuration numbers defining A-SRS resources corresponding to the pieces of identification information on the respective control information formats. In this embodiment, the assumption is made that the plurality of control information formats are DCI format 0 and DCI formation 1A. Thus, the rules for A-SRS transmission can be provided in the table illustrated in FIG. 5, for example. In FIG. 5, the first SRS resources associated with DCI format 0 and the second SRS resources associated with DCI format 1A differ in only cyclic shift among a set of parameters that identify the resources. To put it more specifically, cyclic shift 0 is configured in the resource configuration number (i.e., SRS resource configuration 1) defining the first SRS resources, while cyclic shift 6 is configured in the resource configuration number (i.e., SRS resource configuration 2) defining the second SRS resources. It should be noted that, although cyclic shift differs between the first SRS resources and the second SRS resources n this case, the parameter that differs therebetween is not limited to cyclic shift. For example, comb number alone or both comb number and cyclic shift may differ between the first SRS resources and the second SRS resources. Alternatively, bandwidth may differ between the first SRS resources and the second SRS resources. Base station 100 reports the A-SRS transmission rule configuration information to terminal 200, using RRC signaling. For example, the A-SRS transmission rule configuration information is included in "Sounding RS-UL-Config" message and reported by the message.

Figure 6:
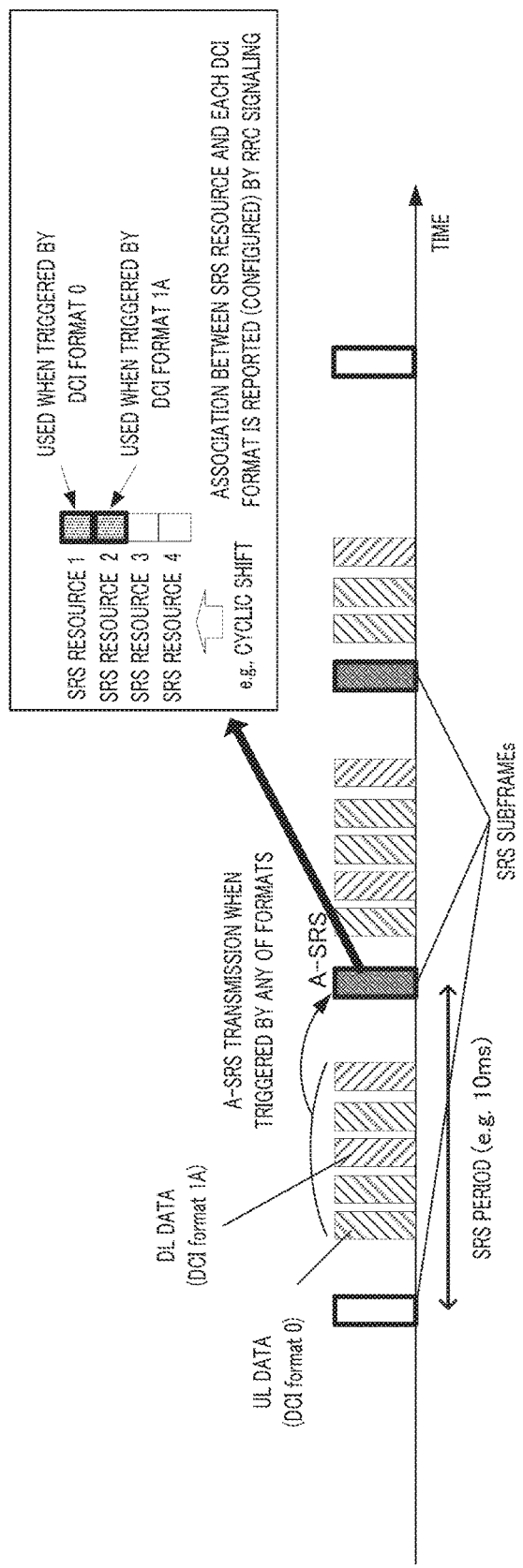
FIG. 6 is a diagram provided for describing transmission of trigger information and A-SRS transmission.

FIG. 6 is a diagram provided for describing transmission of trigger information and A-SRS transmission. As the intervals for assignment of common SRS resources, a period of 10 ms (i.e., 10 subframes) is configured in FIG. 6. If the assignment period for common SRS resources is short, SRS can be transmitted frequently although the resources for data transmission decrease (i.e., increase in overhead), which in turn leads to a decrease in throughput. For this reason, relatively long intervals are configured as the assignment period for common SRS resources in general.

In a situation where use of A-SRS is more appropriate (e.g., situation where a large amount of video data is uploaded in a short period), TCP-ACK and/or the like for uplink data occurs in the downlink. For this reason, it is likely that both of the uplink resource assignment control information and the downlink resource assignment control information are transmitted from base station 100 to terminal 200 within 10 ms, which is the assignment period of common SRS resources. When there is uplink data to be transmitted, the uplink resource assignment control information in DCI format 0 is transmitted, and when there is downlink data to be transmitted, the downlink resource assignment control information in DCI format 1A is transmitted. Although FIG. 6 illustrates, for the purpose of convenience, a case where uplink resource assignment control information and downlink resource assignment control information are transmitted in different subframes, uplink resource assignment control information and downlink resource assignment control information can be transmitted in the same subframe.

Accordingly, base station 100 includes trigger information in the downlink or uplink assignment control information (i.e., downlink resource assignment control information or uplink resource assignment control information) and thereby transmits the assignment control information to terminal 200 within a period of 10 ms, which is the assignment period of common SRS resources. Base station 100 can thereby cause terminal 200 to transmit A-SRS in the first common SRS subframe at or after the transmission timing of the assignment control information.

Transmission controlling section 206 identifies the SRS mapping resources in terminal 200 on the basis of the A-SRS transmission rule configuration information and the format identification information on the DCI from which the trigger information has been extracted. A-SRS transmission rule configuration information is reported to terminal 200 from base station 100 in advance and is thus shard between base station 100 and terminal 200.

In a case where the A-SRS transmission rule configuration information illustrated in FIG. 5 is reported to terminal 200 from base station 100, A-SRS is mapped to the first SRS resources defined by SRS resource configuration 1 described above, when the format identification information on DCI indicates DCI format 0. Meanwhile A-SRS is mapped to the second SRS resources defined by SRS resource configuration 2 described above, when the format identification information on DCI indicates DCI format 1A in this case.

According to Embodiment 1 as described above, base station 100 appropriately selects an assignment control information format (i.e., DCI format) to include the trigger information therein, when triggering A-SRS transmission from a plurality of terminals 200, or a periodic SRS is transmitted from another terminal. Accordingly, A-SRS resources used in each terminal 200 can be flexibly configured. To put it more specifically, it is possible to flexibly configure the resources used for transmission of reference signals while limiting an increase in the number of bits used for trigger information for the transmission of reference signals. As a result, it is possible to avoid a collision between SRS resources of terminals as much as possible while preventing a decrease in throughput due to a delay of SRS.

In addition, since trigger information can be included in any of uplink resource assignment control information and downlink resource assignment control information, the trigger information can be reported during both uplink data assignment and downlink data assignment. Accordingly, appropriately selecting one of the data assignment timings used for reporting an instruction to transmit A-SRS allows flexibly controlling A-SRS resources and also reducing the probability of a collision between the A-SRS resources.

Even when a DCI format other than DCI format 1A is used as the downlink DCI format, the same effects as those described above can be obtained. In addition, different SRS resources may be configured between DCI format 0/1A and another DCI format.

Meanwhile, downlink data in a situation where A-SRS is transmitted in a concentrated manner due to occurrence of uplink data transmissions in bursts in a short period is small in size such as TCP-ACK in many cases. For this reason, the assignment used to report trigger information is limited to smaller contiguous VRBs (or RBs) in this case and assignment using DCI format 1A corresponding to a small amount of control information is appropriate in this case. For this reason, A-SRS trigger information is reported using only DCI format 0 and DCI format 1A, which are adjusted to the same size, and no trigger information is added to another DCI format. Thus, the overhead for data transmission can be reduced.

Embodiment 2

Embodiment 2 relates to cases where trigger information for A-SRS is represented by multiple bits.

Figure 7:
FIG. 7 is a diagram provided for describing rules for A-SRS transmission according to Embodiment 2.

FIG. 7 illustrates A-SRS transmission rule configuration information when trigger information for A-SRS is represented by two bits. In this A-SRS transmission rule configuration information, pieces of identification information on a plurality of control information formats (i.e., DCI formats) are associated with pieces of information about A-SRS resources corresponding to the pieces of identification information for the respective control information formats. In this A-SRS transmission rule configuration information, there are four bit patterns depending on the values and combinations of the multiple bits. Accordingly, four sets of SRS resources corresponding to the four bit patterns are associated with the pieces of identification information on the control information formats. In addition, a correspondence between the combinations of bit values and the sets of SRS resources associated with the combinations of bit values is different at least in part between the control information formats. In FIG. 7, the four sets of SRS resources include a set of SRS resources corresponding to the bit pattern (00) (i.e., no A-SRS transmission), a set of SRS resources corresponding the bit pattern (01) (i.e., transmission using SRS resource configuration 1), a set of SRS resources corresponding the bit pattern (10) (i.e., transmission using SRS resource configuration 2) and a set of SRS resources corresponding the bit pattern (11) (i.e., transmission using SRS resource configuration 3). In FIG. 7, the sets of SRS resources corresponding to the bit patterns other than the bit patterns 00 are mutually different between DCI format 0 and DCI format 1A. Representing trigger information for A-SRS by two bits can increase the number of options in SRS resource assignment, thus reducing the probability of a collision between A-SRS resources of terminals.

FIG. 8 illustrates a variation of the A-SRS transmission rule configuration information. In FIG. 8, a correspondence between the combinations of bit values and the sets of SRS resources associated with the combinations of bit values is different at least in part between the control information formats. Base station 100 may configure only the set of SRS resources corresponding to the combination of bit values that has a partially different correspondence between the control information formats for configuration target terminal 200, individually. In this case, the number of candidates for sets of SRS resources reportable as the trigger information for A-SRS can be kept at minimum. Thus, complexity of terminals 200 and man-hour for testing during development of terminals 200 can be reduced.

Embodiment 3

Embodiment 3 relates to cases where so called carrier-aggregation is applied to communication systems.

In LTE-A systems, the bandwidth is divided into the units of bandwidth called "component carriers" each having a bandwidth not greater than 20 MHz, which is the bandwidth supported by LTE systems. Such component carriers are formed for the purpose of simultaneously achieving backward compatibility for LTE systems and communications at an ultrafast transmission rate, which is several times faster than the transmission rate in LTE systems. To put it more specifically, "component carrier" is a bandwidth of 20 MHz at maximum and is defined as the basic unit of communication bandwidth. Moreover, "component carriers" in downlink (hereinafter, referred to as "downlink component carriers") are defined as bandwidths resulting from division based on downlink frequency bandwidth information in BCH broadcasted from a base station or as bandwidths defined by a dispersion width when physical downlink control channels (PDCCH) are assigned in the frequency domain in a dispersed manner. In addition, "component carriers" in uplink (hereinafter, referred to as "uplink component carriers") are defined as bandwidths resulting from division based on uplink frequency band information in BCH broadcasted from a base station or are each defined as the basic unit of a communication bandwidth which is not greater than 20 MHz and which includes physical uplink shared channel (PUSCH) in the vicinity of the center of the bandwidth and PUCCH for LTE on both ends of the bandwidth. The term "component carriers" may be referred to as cells in English in 3GPP LTE-Advanced. LTE-A systems support communications using a bandwidth obtained by aggregating several component carriers, so called carrier aggregation.

When so called carrier aggregation is applied to a communication system, identification information on a component carrier (CC) can be included as a parameter to define an SRS resource. To put it more specifically, pieces of identification information on control information formats (i.e., DCI formats) can be associated with pieces of CC identification information corresponding to the pieces of identification information on the control information formats in A-SRS transmission rule configuration information.

For example, while an SRS resource on a CC on which uplink resource assignment control information is transmitted (i.e., uplink CC which is the assignment target of the uplink resource assignment control information) is associated with DCI format 0, an SRS resource on a CC other than a CC on which downlink resource assignment control information is transmitted (i.e., downlink CC which is the assignment target of the downlink resource assignment control information) can be associated with DCI format 1A.

In this case, base station 100 previously configures the CC identification information associated with DCI format 1A for configuration target terminal 200, and also reports the CC identification information to configuration target terminal 200 by RRC signaling in advance. Accordingly, it is possible to flexibly configure the resources used for transmission of reference signals while limiting an increase in the number of bits used for trigger information for the transmission of reference signals.

In the abovementioned example, an assumption is made that the CC on which the resource assignment control information is transmitted is identical to the CC which is the assignment target of the resource assignment control information. However, the embodiment is not limited to this case. A first CC on which the resource assignment control information is transmitted may be associated with a second CC which is different from the first CC, as the assignment target CC of the resource assignment control information. In this configuration, while an SRS resource in an uplink CC is associated with a downlink CC on which the uplink resource assignment control information is transmitted, an SRS resource in an uplink CC other than the uplink CC associated with the downlink CC on which the downlink resource assignment control information is transmitted can be associated with DCI format 1A.

It should be noted that, base station 100 may previously configure the pieces of CC identification information respectively associated with DCI formats 0 and 1A for configuration target terminal 200, and also report the pieces of CC identification information to configuration target terminal 200 by RRC signaling in advance.

In addition, a CC set consisting of a plurality of CCs is configured in any terminal in carrier aggregation. When the amount of data to be transmitted is small, a CC or some CCs in the CC set can be temporarily deactivated. When deactivating a CC, base station 100 reports the CC deactivation to terminal 200 by MAC signaling. In this case, it is necessary to cause terminal 200 to transmit SRS even on the deactivated CC in order for base station 100 to know the propagation path condition of the CC. However, terminal 200 receives no PDCCH (i.e., DCI) on a deactivated CC. For this reason, A-SRS transmission cannot be triggered on a deactivated CC when the assumption is made that the CC on which the resource assignment control information is transmitted is identical to the assignment target CC of the resource assignment control information. Accordingly, while an SRS resource on a CC which is activated and on which the resource assignment control information is transmitted is associated with DCI format 0, an SRS resource on a deactivated CC other than a CC which is activated and on which the downlink resource assignment control information is transmitted (i.e., downlink CC which is the assignment target of the downlink resource assignment control information) can be associated with DCI format 1A.

Embodiment 4

In Embodiment 4, downlink resource assignment control information (i.e., DCI format 1A) is transmitted in a subframe having no downlink data to be transmitted, and trigger information is included in this downlink resource assignment control information and transmitted with the downlink resource assignment control information. The technique described in Embodiment 4 can be applied to Embodiments 1 to 3 and 5 to be described, hereinafter.

In the downlink resource assignment control information (i.e., DCI format 1A) transmitted in a subframe having no downlink data to be transmitted, the value of a predetermined parameter normally included in downlink resource assignment control information is set to a predetermined value, and trigger information indicating an instruction to transmit SRS is also included. Terminal 200 that receives this downlink resource assignment control information can recognize the downlink resource assignment control information as control information indicating only a trigger for SRS transmission, when the value of the predetermined parameter is the predetermined value, and the trigger information indicating an instruction to transmit SRS is also included. As a combination of the predetermined parameter and its value, the parameter for the number of RBs to be configured, and the maximum number of RBs or the number of RBs equal to or greater than a threshold can be used, for example. Advantageous effects with the configuration described above will be described, hereinafter.

When the amount of downlink data to be transmitted is small, the opportunity to report assignment, using downlink resource assignment control information (i.e., DCI format 1A) also decreases, so that there may be no opportunity to report assignment, using downlink resource assignment control information (i.e., DCI format 1A) until the nearest SRS subframe. In this case, even if there is no downlink data, base station 200 can appropriately select the format of assignment control information (i.e., DCI format) for including trigger information because base station 200 is allowed to transmit the downlink resource assignment control information in which the value of a predetermined parameter normally included in downlink resource assignment control information is set to a predetermined value, and the trigger information is also included (i.e., DCI format 1A). Accordingly, A-SRS resources used in each terminal 200 can be flexibly configured. Accordingly, it is possible to flexibly configure the resources used for transmission of reference signals, while limiting an increase in the number of bits used for trigger information for the transmission of reference signals. As a result, it is possible to avoid a collision between SRS resources of terminals as much as possible while preventing a decrease in throughput due to a delay of SRS.

Meanwhile, A-SRS is often used in occurrence of a large amount of uplink data transmissions in bursts (e.g., uploading video data and/or the like). For this reason, downlink data that occurs in this case is often TCP-ACK and/or the like and is small in size. Accordingly, the opportunities to assign a large number of RBs using downlink resource assignment control information (i.e., DCI format 1A) are few. Thus, even when the number of RBs to be configured and the maximum number of RBs or a predetermined threshold are set as the predetermined parameter and its value, the flexibility in assignment of RBs in downlink is not affected significantly.

Likewise, only a trigger for A-SRS can be reported using the uplink resource assignment control information (i.e., DCI format 0) by setting the value of a predetermined parameter normally included in the uplink resource assignment control information to a predetermined value and including the trigger information in the uplink resource assignment control information. Normally, there is uplink data in a situation where A-SRS transmission is to be triggered, however. For this reason, it is rare that no uplink data assignment is performed in such a situation. Thus, implementing the function to report only trigger information without reporting resource assignment for data only with downlink resource assignment control information (i.e., DCI format 1A) achieves simplification of base station 100 and terminal 200 as well as a reduction in man-hour for testing during development.

It should be noted that, when invalid assignment (e.g., the number of RBs not less than the system bandwidth) is reported in the downlink resource assignment control information (i.e., DCI format 1A), only a trigger for A-SRS may be reported. To put it more specifically, the combination of a predetermined parameter and its value may be set to a combination of a predetermined parameter and a value that is not valid for the parameter. In addition, as the combination of a predetermined parameter and its value, a parameter for the MCS level and its maximum or a value not less than a predetermined threshold may be set. Furthermore, when trigger information for SRS, which is represented by at least two bits, is used, only one of the states represented by the bits (e.g., 11) may be associated with a trigger for A-SRS.

When the downlink resource assignment control information (i.e., DCI format 1A) only indicates a trigger for A-SRS transmission without indicating resource assignment for data, the information in the DCI except for the information on the trigger for SRS may be all ignored, and a field not related to the downlink data assignment (e.g., transmission power control information on uplink control channel) may be set as an effective field.

Embodiment 5

Embodiment 5 relates to cases where MIMO can be applied to uplink.

FIG. 9 illustrates A-SRS transmission rule configuration information in a case where MIMO can be applied to uplink. In this A-SRS transmission rule configuration information, pieces of identification information on a plurality of control information formats (i.e., DCI formats) are associated with pieces of information about sets of A-SRS resources corresponding to the pieces of identification information for the respective control information formats. In Embodiment 5, however, pieces of identification information on a plurality of control information formats (i.e., DCI formats) are associated with MIMO (or non-MIMO) transmission methods corresponding to the pieces of identification information for the respective control information formats. To put it more specifically, an A-SRS transmission using a single antenna is associated with DCI format 0, and A-SRS transmissions for the number of antennas configured in data transmission (i.e., A-SRS transmission using MIMO) are associated with DCI format 1A and DCI format 4 in FIG. 9.

There are cases where base station 100 reports a single antenna transmission to terminal 200 as a fallback transmission even for terminal 200 in which uplink MIMO transmission is configured as the transmission mode. For example, such a case occurs when an increase in error rate in MIMO transmissions is expected due to a sharp deterioration in the quality of a propagation path. For this reason, A-SRS transmissions using a single antenna are always associated with DCI format 0 so that A-SRS transmissions using a single antenna can be triggered. In addition, in order to allow base station 100 to measure the reception quality for a plurality of antennas for MIMO transmission, A-SRS transmissions corresponding to the number of transmission antennas in terminal 200 in which a MIMO transmission mode is configured are associated with DCI format 4. A-SRS transmissions corresponding to the number of transmission antennas in terminal 200 in which a MIMO transmission mode is configured are associated with DCI format 1A. This is because, since A-SRS transmissions for a plurality of antennas are more likely to involve a collision with an SRS resource for another terminal than A-SRS transmissions for a single antenna, the assignment of SRS resources is made more flexible for the MIMO transmission mode than for the single antenna transmission mode. Accordingly, a greater effect in reducing the probability of collisions can be obtained.

As described above, it is possible to trigger any of an A-SRS transmission using a single antenna and A-SRS transmissions using a plurality of antennas even for terminal 200 in which an uplink MIMO transmission is configured as the transmission mode, while limiting an increase in the number of bits used for trigger information for the transmission of reference signals. In addition, the effect of reducing the probability of collisions can be further improved by associating SRS resources for A-SRS transmissions using multiple antennas with a larger number of DCI formats.

Other Embodiments (1) In each of the embodiments described above, the parameters defining the SRS resources include cyclic shift, comb, the number of RBs (or bandwidth), RB position (or SRS frequency domain starting position in the frequency), frequency hopping pattern, the number of antennas and the like. Comb herein refers to a signal pattern in signals that has a comb-tooth shaped transmission waveform in the frequency domain (e.g., waveform having only even numbered subcarriers in the signal component), which is generated when single carrier signals are repeatedly transmitted. For example, when single-carrier signals are repeatedly transmitted twice, a waveform of alternate subcarriers is formed, so that comb number 0 represents an even numbered subcarrier and comb number 1 represents an odd numbered subcarrier. Meanwhile, comb is called the number of repetitions in some cases.

(2) In each of the embodiments, when carrier aggregation is applied to a communication system, the parameters defining the SRS resources may include information on component carriers. Component carriers are called cells. In addition, a set of CCs includes one primary cell (PCell) and one or more secondary cells (SCell). In this case, an A-SRS transmission in PCell is associated with DCI format 0, and a trigger for A-SRS transmission in SCell may be associated with DCI format 1A.

(3) In each of the embodiments, the frequency domain starting position, bandwidth, cyclic shift and comb number are used as the basic configuration parameters of each SRS resource configuration, but the parameters are not limited to these parameters and a parameter other than these parameters may be included in the basic configuration parameters for SRS resources. All of these basic configuration parameters, i.e., the SRS resource configuration itself may be associated with each DCI format. Alternatively, only a part of the basic configuration parameters may be associated with each DCI format.

(4) In each of the embodiments, it is also possible to additionally configure A-SRS resources to be used when the instructions to transmit SRS are triggered simultaneously in a plurality of DCI formats. Accordingly, even more flexible SRS resource assignment is possible. Meanwhile, an error in receiving PDCCH occurs with a poor error rate in receiving DCI. When no DCI is detected, A-SRS is transmitted with erroneous SRS resources. For this reason, in a system that may involve an error in receiving PDCCH, terminal 200 may be configured to treat DCI as invalid when receiving trigger information for SRS, which indicates an instruction to transmit SRS, in a plurality of DCI formats in a single subframe. This configuration prevents terminal 200 from erroneously transmitting SRS.

(5) In each of the embodiments, base station 100 may configure whether or not to include trigger information for SRS in DCI for each terminal 200 and report the result of configuration to each terminal 200 by RRC signaling. In this case, it is possible to reduce the number of bits of DCI transmitted to terminal 200 in an operation that uses no A-SRS (e.g., voice communications only), or terminal 200 using an application that uses no A-SRS. Accordingly, it is possible to reduce the overhead in this case. Moreover, base station 100 may configure the number of bits to represent the trigger information for SRS and reports the result of configuration to terminal 200 by RRC signaling.

(6) In each of the embodiments, terminal 200 is configured to transmit A-SRS in a common SRS subframe. However, the claimed invention is not limited to this configuration, and terminal 200 may be configured to transmit A-SRS in an individual SRS subframe.

(7) In addition to the parameters for SRS resources, a correspondence between information about the transmission power of SRS and each DCI format may be configured. For example, in a system configured to perform interference control in coordination between cells, A-SRS is triggered by a DCI format associated with a low transmission power configuration in a subframe whose interference to a different cell is hoped to be reduced, while A-SRS is triggered by a DCI format associated with a low transmission power configuration in a subframe whose interference to a different cell may be large. Accordingly, it is possible to flexibly configure the transmission power of A-SRS without increasing control information.

(8) SRS transmitted from terminal 200 may be used for downlink weighting (or precoding) control of each antenna and/or the like other than for estimation of a propagation path condition, uplink MSC configuration, frequency scheduling and weighting (directivity) control of each antenna performed by base station 100. In this case, SRS resources for the uplink MCS configuration, frequency scheduling and weighting control of antennas, and SRS resources for the downlink weighting control of antennas may be configured for different DCI formats. Accordingly, it is possible to trigger A-SRS for each application without increasing the reporting bits.

(9) In each of the embodiments, a description has been provided with antennas, but the claimed invention can be applied to antenna ports in the same manner.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing base stations to transmit different reference signals.

In addition, an antenna port may be specified as a minimum unit to be multiplied by a precoding vector weighting.

(10) In the each of the embodiments, a description has been provided using an example in which the claimed invention is implemented by hardware, but the claimed invention may also be implemented by software in cooperation with hardware.

The functional blocks used in the description of each of the embodiments may typically be implemented as an LSI, which is an integrated circuit. The functional blocks may be formed as individual chips, or some of or all of the functional blocks may be integrated into a single chip. The term "LSI" is used herein, but the terms "IC", "system LSI", "super LSI", or "ultra LSI" may also be adopted depending on the degree of integration.

In addition, the circuit integration does not have to be achieved using an LSI and may be achieved using a dedicated circuit or a general-purpose processor other than an LSI.

A field programmable gate array (FPGA), which is programmable after LSI manufacturing, or a reconfigurable processor which allows reconfiguration of connections and settings of circuit cells in an LSI after LSI manufacturing may be used.

Should a circuit integration technology replacing LSI appear as a result of advancements in semiconductor technology or other derivative technology, the functional blocks could be integrated using such a technology. Biotechnology applications, and/or the like, are conceivable prospects.

The disclosure of the specification, the drawings, and the abstract included in Japanese Patent Application No. 2010-229905, filed on Oct. 12, 2010, is incorporated herein by reference in its entirety.

INDUSTRIAL APPLICABILITY

The communication apparatus and communication method of the claimed invention are useful in that they allow flexibly configuring resources used for transmission of reference signals while limiting an increase in the number of bits used to request the transmission of reference signals.

REFERENCE SIGNS LIST

100 Base station
101 Configuration section
102, 103 Coding and modulation section
104 Transmission processing section
105, 208 RF transmitting section
106, 201 antenna
107, 202 RF receiving section
108, 203 reception processing section
109 Data receiving section
110 SRS receiving section
200 Terminal
204 Reference signal generating section
205 Data signal generating section
206 Transmission controlling section
207 Transmission signal forming section

The invention claimed is:

1. A communication apparatus comprising:
a receiver, which, in operation, receives downlink control information including a sounding reference signal (SRS) transmission request, using one downlink control information format (DCI format) among a plurality of DCI formats,
wherein each DCI format corresponds to at least one set of SRS parameters, at least one set of SRS parameters for one DCI format is different from another at least one set of SRS parameters for another DCI format, and each set of SRS parameters specifies one of a plurality of SRS resources for use in transmitting the SRS, and
wherein the plurality of DCI formats include a first DCI format corresponding to one set of SRS parameters and a second DCI format corresponding to three sets of SRS parameters; and
a transmitter, which, in operation, transmits the SRS using the SRS resource specified by the set of SRS parameters corresponding to said one DCI format.

2. The communication apparatus according to claim 1, wherein
the set of SRS parameters includes an initial resource block position of the SRS resource, as well as a bandwidth, a cyclic shift and a transmission comb of the SRS resource.

3. The communication apparatus according to claim 1, wherein
corresponding relationships between each of the plurality of DCI formats and the at least one set of SRS parameters are shared with a base station apparatus.

4. The communication apparatus according to claim 1, wherein
the plurality of SRS resources are resources in an SRS subframe used for transmitting the SRS.

5. The communication apparatus according to claim 1, wherein the transmitter does not transmit the SRS when the receiving section receives the downlink control information using a plurality of DCI formats in a single subframe.

6. A communication method comprising:
receiving downlink control information including a sounding reference signal (SRS) transmission request, using one downlink control information format (DCI format) among a plurality of DCI formats,
wherein each DCI format corresponds to at least one set of SRS parameters, the at least one set of SRS parameters for one DCI format is different from another at least one set of SRS parameters for another DCI format, and each set of SRS parameters specifies one of a plurality of SRS resources for use in transmitting the SRS, and
wherein the plurality of DCI formats include a first DCI format corresponding to one set of SRS parameters and a second DCI format corresponding to three sets of SRS parameters; and
transmitting the SRS using the SRS resource specified by the set of SRS parameters corresponding to said one DCI format.

7. The communication method according to claim 6, wherein
the set of SRS parameters includes an initial resource block position of the SRS resource, as well as a bandwidth, a cyclic shift and a transmission comb of the SRS resource.

8. The communication method according to claim 6, wherein
corresponding relationships between each of the plurality of DCI formats and the at least one set of SRS parameters are shared between a terminal apparatus and a base station apparatus.

9. The communication method according to claim 6, wherein
the plurality of SRS resources are resources in an SRS subframe used for transmitting the SRS.

10. The communication method according to claim 6, wherein the SRS is not transmitted when the downlink control information is received using a plurality of DCI formats in a single subframe.

* * * * *